Nov. 29, 1938.　　　J. G. VINCENT　　　2,138,463
MOTOR VEHICLE
Filed Dec. 13, 1935　　　2 Sheets-Sheet 1
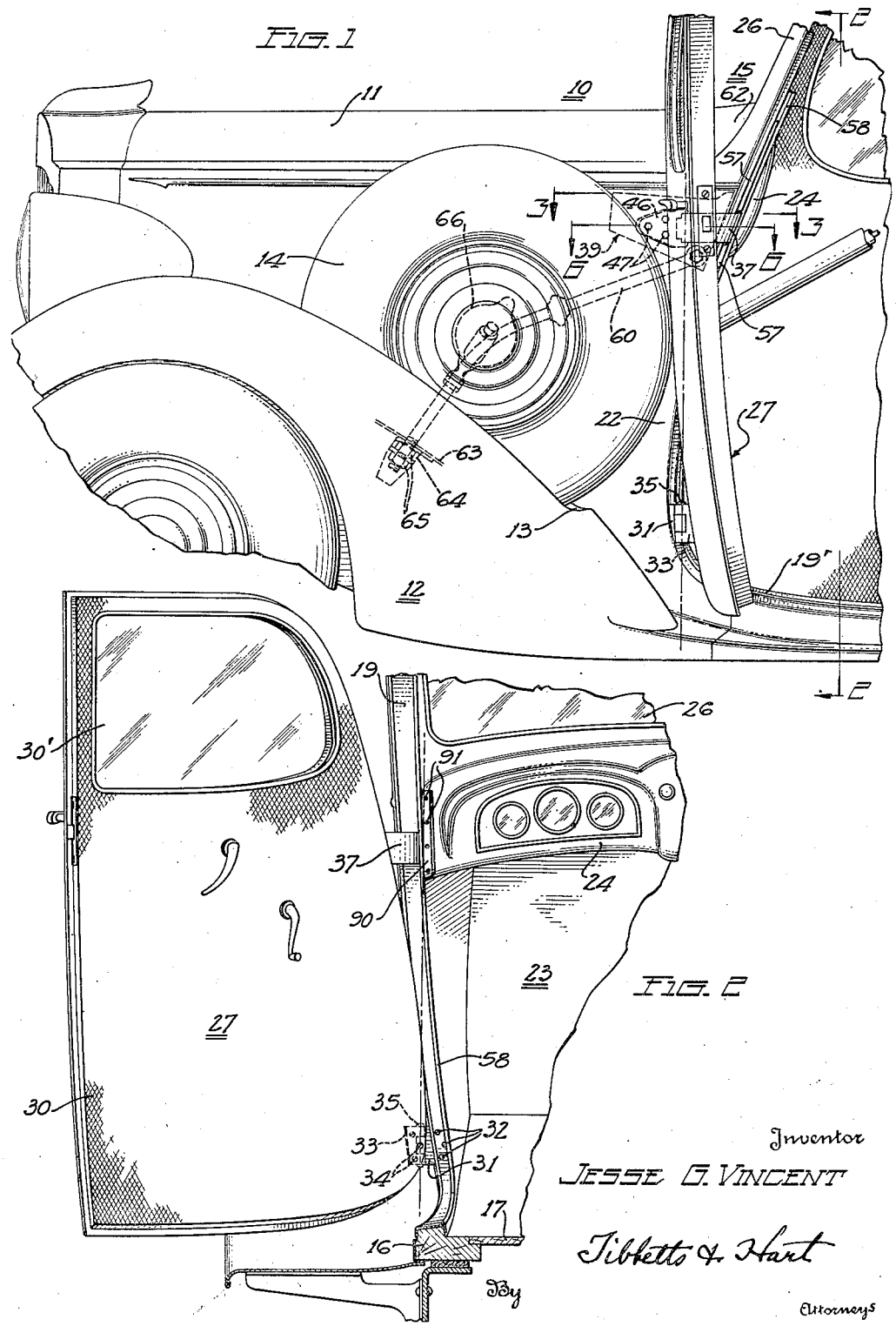

Nov. 29, 1938.  J. G. VINCENT  2,138,463
MOTOR VEHICLE
Filed Dec. 13, 1935  2 Sheets-Sheet 2
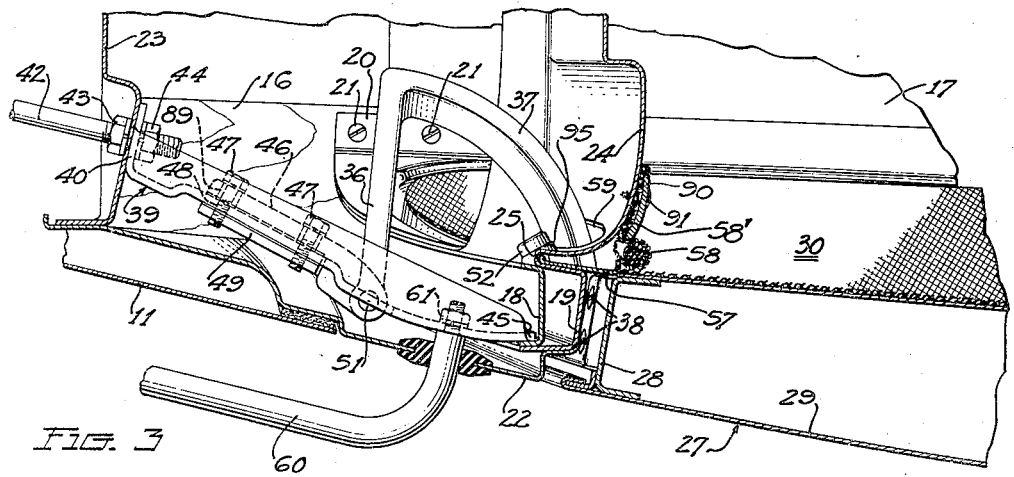
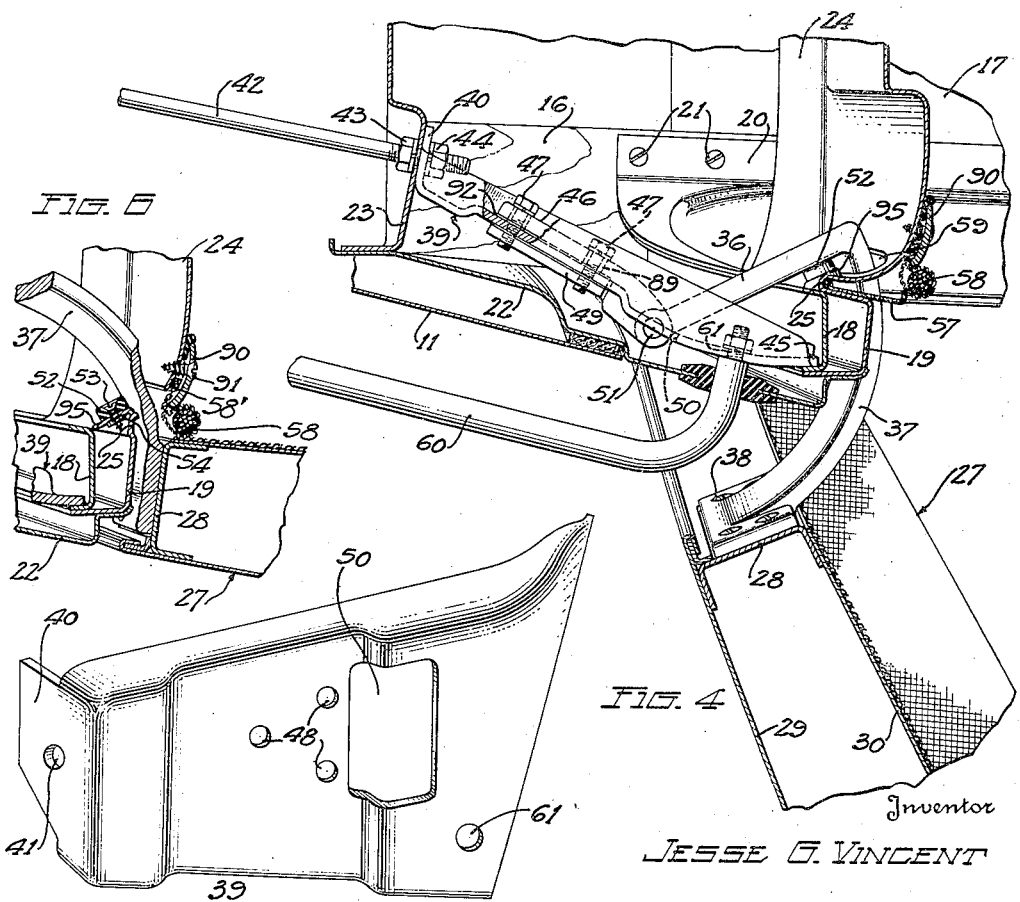
Inventor
JESSE G. VINCENT
By Tibbetts & Hart
Attorneys Patented Nov. 29, 1938

2,138,463

UNITED STATES PATENT OFFICE 2,138,463

MOTOR VEHICLE

Jesse G. Vincent, Grosse Pointe, Mich., assignor to Packard Motor Car Company, Detroit, Mich., a corporation of Michigan Application December 13, 1935, Serial No. 54,205

11 Claims. (Cl. 296—44)

This invention relates to motor vehicles and more particularly to door supporting means therefor.

In recent years the style trend in motor vehicle construction has been to tilt the windshield rearwardly and thus bring it back closer to the driver, so that vision is improved. This has called for an extension of the door opening somewhat forwardly at the bottom to allow for more foot room in entering and leaving the vehicle. These trends resulted in a front door opening in which the forward edge was considerably inclined upwardly and rearwardly, usually curving near the bottom to give a pleasing appearance, but it also made it necessary to hinge the door at its rear edge, as obviously the door could not be swung on hinges following the inclination of the front edge of the door, because to do so would cause the door to swing on an inclined axis so that the door would have to be partly lifted as it was opened and it would have to be held open when getting in and out.

But front doors hinged at the rear edge have the objection that if one opens the door slightly for the purpose of closing it tightly, while the car is moving, the door may be caught by the passing air stream and pulled from one's grasp, or the door, under these circumstances, may even pull one out of the car. Many of these doors are made very wide and, consequently, when open, they extend a considerable distance outwardly from the car.

One of the objects of the present invention is to provide for hinging at the front edge a motor vehicle door such as described above.

Another object of the invention is to provide hinging for such doors without marring the streamlining of the body of the vehicle.

Another object of the invention is to provide vertical hinging for a motor vehicle door at the inclined edge thereof.

In some motor vehicles of the type referred to the side of the body is inclined inwardly and downwardly and it is one of the objects of the present invention to provide door hinges on such bodies without unsightly exposure of the hinges.

Another object of the invention is to provide hinges for motor vehicle doors in which one of the hinges is outside of the body and another hinge is inside of the body.

Another object of the invention is to provide door hinges for doors having an inclined edge in which one hinge is arranged forwardly of the door edge and another one rearwardly thereof.

Another object of the invention is to provide a door having a front slanting edge with pivot means arranged so that one of them is concealed within the body when the door is closed.

It is frequently desirable to mount the spare wheel of a motor vehicle between the front wheel and the front door, usually in a well in the fender. Hence the front door of the vehicle must be swung so that it will not interfere with the spare wheel. In the present invention the lower hinge of the door is placed rearwardly of the extreme forward edge of the door so that the door will clear the spare wheel, and yet so that there may be a full opening of the door to permit easy access to the vehicle front seat.

It is also an object of the invention to provide supporting means for a spare tire such that the door hinge support may be strengthened thereby and parts reduced in the manufacture of the vehicle.

Other objects of the invention will appear from the following description taken in connection with the drawings forming a part of this specification, and in which:

Fig. 1 is a side elevation of the forward portion of a motor vehicle incorporating the invention, the left front door being shown in wide open position.

Fig. 2 is a sectional view substantially on the line 2—2 of Fig. 1.

Fig. 3 is an enlarged section substantially along the line 3—3 of Fig. 1, illustrating some of the details of one of the door hinges and its supporting means, the door being shown in closed position.

Fig. 4 is a view similar to Fig. 3, with the door shown in open position.

Fig. 5 is a perspective view of one of the body brackets which supports one of the door hinges; and Fig. 6 is a sectional view substantially on the line 6—6 of Fig. 1.

The forward end of a motor vehicle incorporating my invention is indicated generally at 10 and is provided with a conventional hood 11, enclosing the engine (not shown), and forward fenders 12. The specific type of fender illustrated is formed with a well 13 for receiving a spare wheel 14.

At the rear of the engine hood and mounted on a conventional form of chassis main frame (not shown) is a body indicated generally at 15 having longitudinally extending side sills 16, and a floorboard 17 extending between such side sills.

The left front door opening of the body is illustrated in the drawings and the forward edge of this opening is formed by a portion of the body frame in the form of a pillar comprising partially nested channels 18 and 19, preferably welded together. To form the frame structure the lower ends of these channels 18 and 19 are extended as at 20 to rest upon the adjacent body sill 16 and secured thereto by suitable means such as screws or bolts 21.

The general form of this upright pillar is substantially straight throughout a portion of its length, but inclined upwardly and rearwardly, and the lower portion thereof curves so that at its extreme lower end it turns toward the rear to form the door sill 19'. The upper portion follows the general slant of the windshield structure 26 of the vehicle and the lower portion extends far enough forward to give foot room for easy access to the front seat of the vehicle.

One of the body side panels is indicated at 22, this being suitably secured to the pillar 18, 19, and secured to the forward part of this body panel 22 and extending crosswise of the vehicle, is the metal dash 23. Also extending across the body of the vehicle somewhat rearwardly of the dash 23, is an instrument board 24 secured, as by welding, to the portion 19 of the pillar, as at 25. A suitable plate 62 also extends from the dash to the instrument board, thus forming the cowl of the vehicle.

A door 27 is provided to fit the door opening in the body and it consists of the usual frame 28, outer panel 29, and inner panel 30. The window is indicated at 30'. Adjacent the lower end of the door is a hinge 31 having one of its leaves secured to the pillar 19 as by screws 32, and having its other leaf 33 secured to the door as by screws 34. The hinged pin is indicated at 35 and it will be seen that it is not only arranged outside of the vehicle body, but it is also slightly rearwardly of the forwardmost part of the front edge of the door opening.

This lower hinge 31 is inconspicuous, first, because it is lower down on the door and, second, because it extends outwardly from the body only a short distance, in spite of the fact that the body at this point is inclined inwardly somewhat with respect to the portion of the body adjacent the instrument board. This short hinge may be used because of the construction and arrangement of the upper hinge of the door.

The upper hinge means of the door consists of an angular leaf member having a straight arm 36 and a curved, or arcuate, arm 37, this arc extending about ninety degrees, which is approximately the amount of swing permitted the door on its hinges. The arm 37 of this leaf of the spring is secured to the frame of the door as by the screws 38 at a point a little more than half way up from the bottom of the door and preferably opposite the instrument board 24.

The curved arm 37 of this upper hinge leaf extends through the door opening adjacent the pillar 19 and through an opening 59 in that part of the instrument board 24 which is adjacent the pillar 19, and the straight arm 36 of the leaf is pivoted on the inside of the body on a pivot pin 51. Because the body at this point is inclined outwardly relative to the lower part of the body adjacent the hinge 31, this pivot 51 may be arranged substantially vertically in line with the pivot 35 of the hinge 31, so that the door will swing on a substantially vertical axis. By reason of the angular shape of the leaf 36, 37, of the upper hinge, this hinge part swings entirely inside of the body and under the cowl, forwardly of the instrument board 24, when the door is closed, and consequently the hinge is entirely concealed. There is nothing on the outside of the body to indicate the presence of this hinge and the flowing lines of the body are not interfered with in any way.

The other leaf of the upper hinge is indicated at 46 and it is adjustably mounted upon a bracket 39, which is shown in the form of a stamping having a flange 40 connected to the dash 23 and a part 45 connected, as by welding or otherwise, to the channel part 18 of the body pillar. Thus this bracket member 39 extends substantially parallel with the panel 22 of the vehicle body and forms a reinforcement for the body and for the dash and pillar. The adjustable connection of the leaf 46 to the bracket member 39 is by reason of the holes 89 in the leaf being made larger than the bolts 47 which extend through openings 48 in the bracket and into threaded openings in a plate 49 on the opposite face of the bracket. Thus the leaf 46 may be adjusted with reference to the bracket member 39 to correctly position the pivot 51 in line with the pivot 35 of the lower hinge and then the bolts 47 may be tightened to secure the leaf in place. One or more shims 92 may also be used to adjust the leaf 46 laterally of the vehicle to thus afford another adjustment to compensate for slight differences in manufacture.

The connection of the bracket member 39 to the dash 23 may be by means of a rod 42 extending from the engine radiator (not shown) and passing through the dash 23 and the flange 40 of the member 39. Nuts 43 and 44 on opposite sides of the dash and flange secure the parts together and provide for adjustment of the brace rod 42.

The bracket member 39 may also be used to support the upper end of a rod 60, as by the nut and threaded connection 61, the other end of the rod 60 being connected to a portion 63 of the fender 12 inside of the well 13 above described. A bracket 64 and nuts 65 form the means for securing the lower end of the rod 60 to the fender. The wheel carrier bracket 66 is suitably mounted upon the rod 60.

Secured along the inner edge of the pillar 19 is the usual inside weatherstrip, or windlace, 58, but adjacent that portion of the pillar traversed by the hinge arm 37 the flange portion 58' of the windlace is secured to the adjacent portion of the instrument board by a molding strip 90 secured to the instrument board by screws 91. This is shown particularly in Figs. 2, 3, 4, and 6. Also, the cord portion of the windlace 58 is held away slightly from the pillar 19 just above and below the hinge arm 37, so that the arm may pass between the pillar and the windlace. This is done by two short metal strips 57, one above and the other below the path of travel of the arm 37, which strips 57 are suitably secured to the pillar 19. Thus is provided an opening between the pillar 19 and the windlace and between the strips 57 just large enough to receive the arm 37, and this arm is so shaped and the arm 36 is of such length that, as the door swings on its hinges, the arm 36 will move into and out of this opening without materially rubbing on any of the adjacent parts of the body. At the same time, when the door is closed a wind-tight joint is secured around the door, just as is done when the door is pivoted on outside hinges.

The angular hinged leaf 36, 37, acts as its own limit strap for the door and a cushioned stop is provided in the form of a rubber block 52 secured on a boss 95 which is shown as pressed out of the flanged portion of the pillar 19. A screw 53 and plate 54 retain the block 52 in position.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a vehicle having a body with a door opening slanting rearwardly toward the top along its forward edge and a door for closing said opening having a slanting forward edge complementary to the forward edge of the opening, means for mounting the door to swing horizontally comprising a pair of separated hinges having substantially vertically aligned pivots and each hinge having a portion fixed to the forward edge portion of the door and a portion fixed to the body, the door portion of the lower of said hinges being mounted at a point adjacent the most forward part of said slanting forward edge of the door and the the door portion of the upper of said hinges being mounted on said forward slanting edge of the door at a point substantially rearwardly of the point of mounting of the lower hinge, one of said hinges being inside the body when the door is closed.

2. In a vehicle having a body with a door opening having its forward edge slanting rearwardly toward the top and a door for the opening, means for mounting the door to swing horizontally comprising an upper concealed hinge fixed to the forward edge of the door and to the body in advance of the door, and a lower hinge fixed to the forward edge of the door and the body, the point of fixing of the lower hinge on the door being substantially forward of the point of fixing of the upper hinge along the slanting forward edge of the door, the axes about which said hinges pivot being in vertical alignment.

3. In a vehicle body, a front pillar having a door opening at the rear thereof, an instrument board fixed to and having a longitudinally extending portion adjacent the pillar, a continuous windlace strip along the rear inner edge of said pillar, said windlace extending between the instrument board and the pillar, means fixed to the pillar for holding the windlace adjacent the instrument board out of the door opening, and a door hinge element movable through the instrument board and between the windlace and the pillar.

4. In a vehicle, a body having a door opening and an instrument board with an opening therein, a door for closing said door opening, said door opening and said door having complementary portions of their adjacent edges extending rearwardly toward the body top, a lower hinge fixed to the door and the body with the pivot extending vertically, and an upper hinge fixed in the body and to the door adjacent the rearwardly extending portions thereof, said upper hinge having its pivot in line with the lower hinge pivot and the leaf portion fixed to the door extending arcuately about its pivot, said arcuate hinge leaf portion extending through the opening in said instrument board.

5. In a motor vehicle, the combination of a body having a portion of its side inclined inwardly in a downward direction and having a door opening in said inclined side, said opening formed with its forward edge slanting forwardly in a downward direction, a door for said opening having its forward edge inclined with the body and slanting with said opening, and hinge means between the inclined and slanting forward edge of said door and the body, said hinge means comprising a lower hinge near the bottom of the door and an upper hinge connected to the slanting forward edge of the door some distance rearwardly of the lower hinge and pivoted inside the body in substantially vertical alignment with the pivot of the lower hinge.

6. In a motor vehicle, the combination of a body having a portion of its side inclined inwardly in a downward direction and having a door opening in said inclined side, said opening formed with the greater part of its forward edge slanting forwardly in a downward direction, a door for said opening having its forward edge inclined with the body and slanting with said opening, and hinge means with substantially vertical pivots between the inclined and slanting forward edge of said door and the body, said hinge means including a hinge connected substantially to the middle of the inclined and slanting forward edge of said door and so pivoted to the body inside its outer surface that the entire door in the zone of said hinge moves away from the body during the complete outward swinging arc of the door.

7. In a motor vehicle, the combination of a body having a portion of its side inclined inwardly in a downward direction and having a door opening in said inclined side, said opening formed with its forward edge slanting forwardly in a downward direction, a door for said opening having its forward edge inclined with the body and slanting with said opening, and hinge means between the inclined and slanting forward edge of said door and the body, said hinge means including a lower hinge near the bottom of the door and outside the body and an upper hinge substantially vertically aligned with the lower hinge and connected to the slanting forward edge of the door appreciably rearwardly of the lower hinge and pivoted to the body appreciably forward of the opening in the zone of said hinge.

8. In a vehicle, a body having a dash and a front pillar, a supporting element extending between and fixed to the dash and the pillar, and a door hinge having one of its leaves secured to said element between the fixed ends thereof.

9. In a vehicle, a body having a dash and a front pillar, a supporting bracket extending between and secured to the dash and the pillar, a door for said body, and a hinge having one leaf fixed to the door and the other leaf adjustably secured to said bracket within the body.

10. In a vehicle body, a side thereof having a door opening formed therein, said side including a door pillar, a continuous windlace strip mounted in close relationship with the rear inner edge of said pillar, a door for said door opening, the inner edge of said door closing against said windlace, a hinge for said door pivoted to the body inwardly of the side thereof and forwardly of said pillar and having an arm extending through an opening in the side of said body between the outer edge of said pillar and said windlace.

11. In a vehicle body, a side thereof having a door opening formed therein, said side including a door pillar and said side having a hinge leaf opening at a point inwardly of the outer edge of said pillar and extending to the interior of the body, a door for closing said door opening, said door opening and said door having complementary portions of their adjacent edges extending rearwardly toward the body top, a lower hinge fixed to the door and to the body with the pivot extending vertically, and an upper hinge fixed in the body and to the door adjacent the rearwardly extending portions thereof, said upper hinge having its pivot inside the body forward of said pillar and in line with the lower hinge pivot and having its door leaf portion extending arcuately about its pivot, said arcuate hinge leaf portion extending through said hinge leaf opening in the side of said body.

JESSE G. VINCENT.